Figure 1:
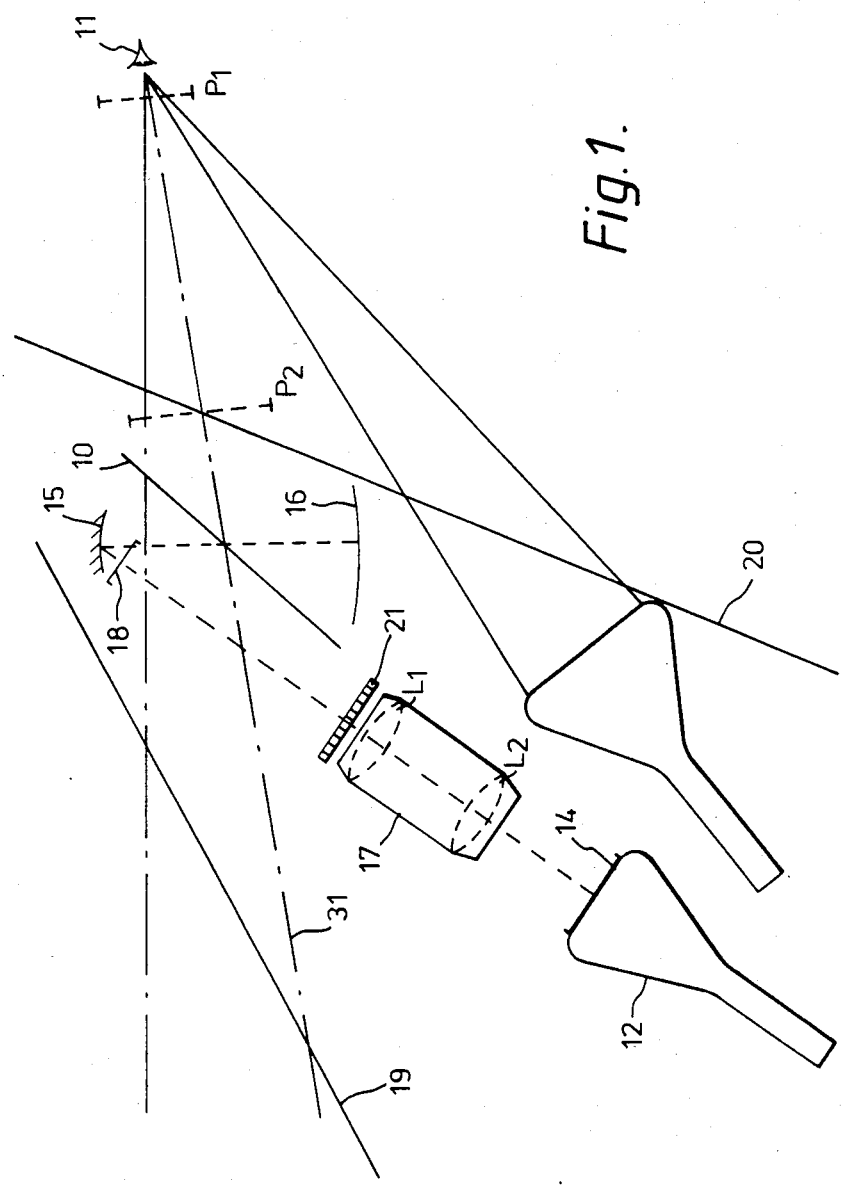

United States Patent [19]

Banbury

[11] Patent Number: 4,714,320

[45] Date of Patent: Dec. 22, 1987

[54] DISPLAY SYSTEMS

[75] Inventor: John R. Banbury, Fleet, England

[73] Assignee: The Secretary of State for Defence in Her Britannic Majesty's Government of the United Kingdom of Great Britain and Northern Ireland, London, England

[21] Appl. No.: 677,329

[22] Filed: Dec. 3, 1984

Related U.S. Application Data

[63] Continuation of Ser. No. 308,192, Aug. 21, 1981.

[30] Foreign Application Priority Data

Aug. 21, 1980 [GB] United Kingdom ............... 8027278
Jul. 8, 1981 [GB] United Kingdom ............... 8121142

[51] Int. Cl.$^4$ .................... G02B 27/14; G09G 3/02
[52] U.S. Cl. .................... 350/174; 340/705; 358/109
[58] Field of Search .............. 358/109; 350/174; 340/705

[56] References Cited

U.S. PATENT DOCUMENTS

3,892,474 7/1975 Nilsson .................... 350/174
4,264,134 4/1981 Ellis ........................ 350/174

FOREIGN PATENT DOCUMENTS

0007039 1/1980 European Pat. Off. ........... 350/174
2031610 4/1980 United Kingdom ............... 350/174

OTHER PUBLICATIONS

M. H. Freeman, Optics Technology, Feb. 1969, Aug. 1969, Parts I & II, pp. 63 & 175 respectively.
*The Photonics Dictionary*, The Optical-Purchasing Directory, 1981.

*Primary Examiner*—Stephen C. Buczinski
*Attorney, Agent, or Firm*—Cushman, Darby & Cushman

[57] ABSTRACT

In a display system light from an object (14) is deflected on to a collimator (16) and superimposed on an external view through a combiner (10) from an observing position (11). Relay optics (17) in the path of light from the object (14) has spaced apart elements ($L_1$, $L_2$) which produce first and second exit pupils ($P_1$, $P_2$). Exit pupil volumes ($V_1$, $V_2$) overlap to give an extended field of biocular view. The restricted field of view associated with prior art display systems is overcome since the present system provides a large field of view at the observing position (11), while system components fit within aircraft space constraints, such as windshield (19), fairing (33) and ejection line (20). Space remains available for other instrumentation, such as a second display CRT (45).

8 Claims, 3 Drawing Figures

DISPLAY SYSTEMS

This is a continuation of application Ser. No. 308,192, filed Aug. 21, 1981.

This invention relates to display systems, and in particular to head-up display systems which provide a display of an object superimposed on an external view.

It is desirable that head-up display (HUD) systems should provide a wide field of view, and that the view should be biocular. Unfortunately space available for the installation of components of a HUD system is usually severely restricted, as for example in installation in an aircraft cockpit, which limits the field of view which can be provided.

In conventional HUD systems light from an object is directed onto a combiner, which is an inclined optical element having the property that the light is reflected at the combiner surface such that it appears superimposed on an external view through the combiner. In order that the image may appear at infinity or other preferred distance a collimating optical element is included in the light path. The instantaneous field of view of a conventional head-up display system, that is the angular field of superimposed and collimated display which can be seen using the two-eyes of the observer is limited by the size of the collimating element, and the angle subtended by its image in the combiner, which is referred to as the system port-hole. The biocular field of view is the field seen simultaneously by both eyes and is restricted to the small region of the overlap of port-holes for each eye.

In order to overcome the above restriction, combiners with optical power have been employed in the form of mirrors used off-axis. To facilitate aircraft installation in such a system an intermediate image formed by a relay lens is collimated and combined with the outside view. The field of view is limited as before by the dimensions of the combining element, and in addition by the diameter of the relay lens, which is imaged close to the observer giving rise to an exit pupil through which the combined image may be viewed. The full field of view subtended by the combiner may be seen by either eye, or both eyes if they are located within the exit pupil volume. Unfortunately, aberrations in such systems arranged for a wide field of view are severe. Use of a relay lens offers some scope for correction, but even with complex multi-element relay optics significant aberration and biocular disparity must be tolerated if the advantages of a wide field of view are to be provided. Such a system can seldom be configured for aircraft installation without employing a bulky and difficult to make single element as both collimator and combiner, which is difficult to maintain accurately positioned as it necessarily occupies a vulnerable position above the aircraft instrument panel.

In recent years, much interest has been shown in the possibility of using diffractive-optical elements in head-up display systems. Such elements can offer useful benefits due to their lower mass, high transmission, narrow band and angle response, and partial aberration correction. Unfortunately, the potential advantages offered by diffractive elements have not been fully realised, and in particular the prospect of systems including large diffractive optical elements of low mass and low cost has not been fulfilled. The high basic aberrations of the off-axis mirror systems, as discussed above, in which diffractive combiners have so far been used, have also prevented the achievement of ideal levels of accuracy and biocular disparity in wide field-of-view head-up displays with an adequately large exit pupil to allow sufficient freedom of head movement for the observer.

On-axis systems, having the advantage of inherently lower aberration, in which a collimator placed above the external sight line reflects onto a plane combiner placed in the sight line have been proposed. Although the performance of such systems is potentially acceptable the large collimator that would be required in a large field of view system is incompatible with space constraints which apply in aircraft.

According to the present invention a display system includes means for producing an object, a collimator for producing a collimated image of the object, a combiner for producing a display of the object superimposed on an external view through the combiner from an observing position and relay optics in the path of light from the object and between the object and the collimator, the relay optics having spaced apart elements to produce a first exit pupil close to the observing position and a second exit pupil close to the combiner.

The first and second exit pupil volumes are advantageously arranged to overlap to produce field of biocular view extending toward the combiner from the observing position. It will be appreciated that this arrangement provides a display system in which observer movements about the observing position may be made without loss of binocular view.

In a preferred arrangement of the present invention light from the object is deflected by a reflective optical element positioned to one side of the display centre line from observer to combiner onto a collimator positioned to the other side of the display centre line. The optical elements are advantageously used on-axis or near axis and the combiner is preferably planar in order to achieve a maximum field of view in elevation and a symmetrical distribution of aberrations about the display centre line.

A head-up display system in accordance with the present invention may be advantageously installed in an aircraft by downward extension of the light path from the object to a reflector placed above the display centre line. Thus the means for producing the object, such as for example a cathode ray tube, may be situated within aircraft instrument panel space overcoming the obscuration of external view caused by system components conventionally positioned above the instrument panel. The present invention facilitates installation of a second display for head down viewing, preferably with a light path folded between the spaced apart elements of the relay optics.

In a further preferred arrangement of the present invention recording system optics are provided in the second exit pupil so that a record of the display together with the external view may be made exactly as presented to the observer.

Figure 2:
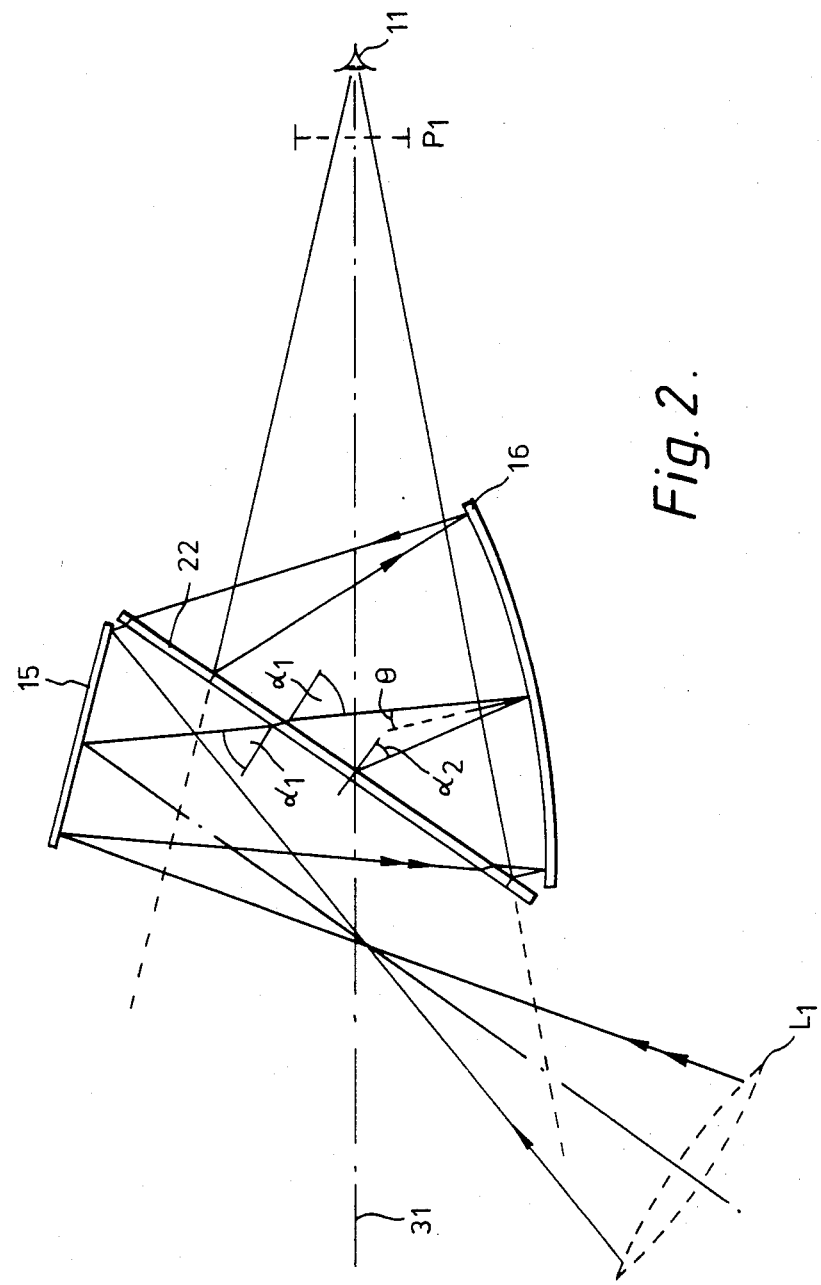
Figure 3:
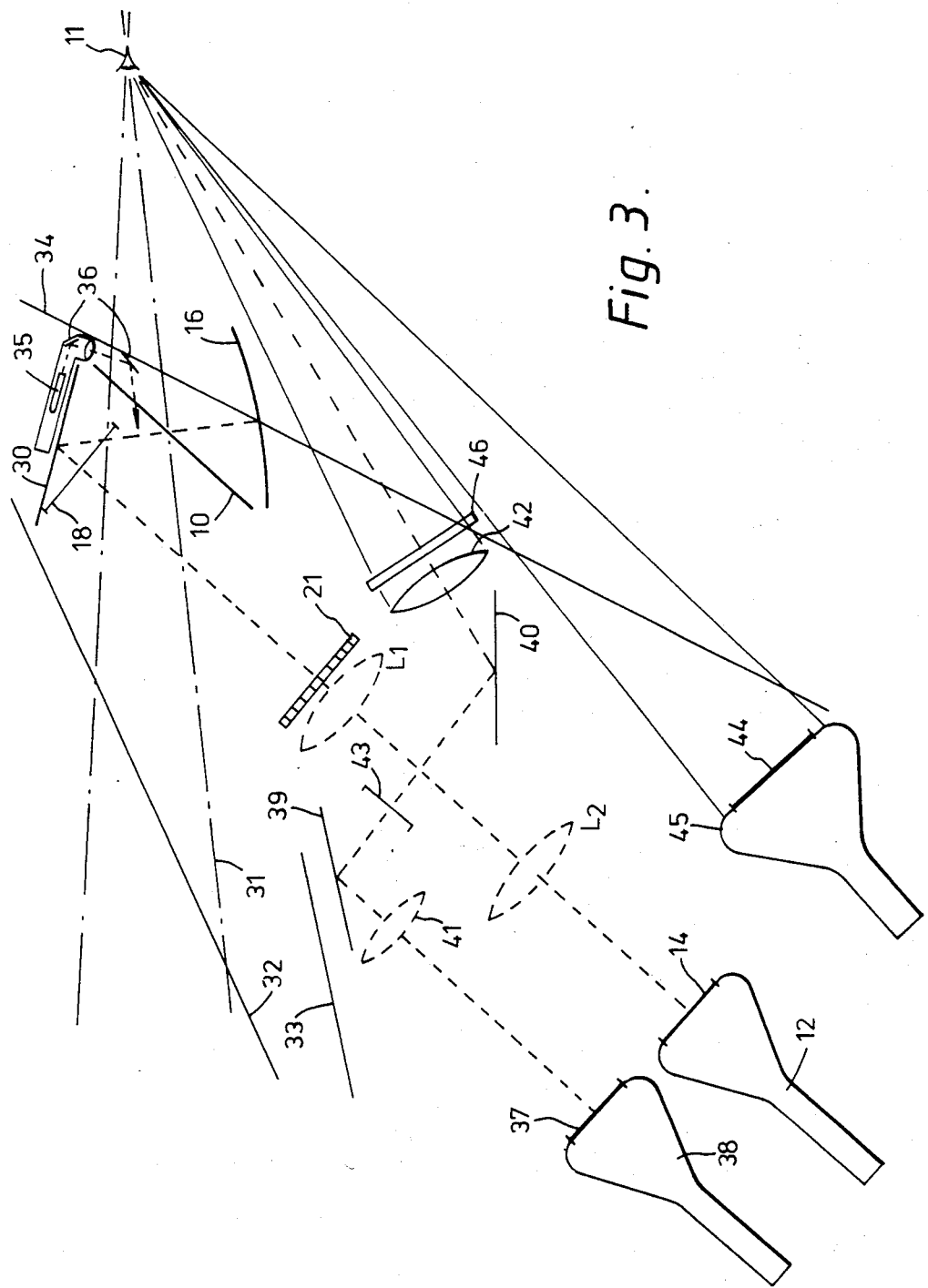

In order that features and advantages of the present invention may be further appreciated embodiments will now be described with reference to the accompanying diagrammatic drawings of which:

FIG. 1 represents a head-up display system in accordance with the present invention, FIG. 2 an arrangement operated near axis, and FIG. 3 another display system in accordance with the present invention for aircraft installation.

Where parts are the same common reference numerals have been used.

A cathode ray tube (CRT) 12 (FIG. 1) produces an object in the form of a display 14 to be imaged. Light from the display 14 enters relay optics 17 which is arranged to form a real image 18 of the display in front of a reflector 15 which directs light on to a reflective diffractive collimator 16, which provides a collimated image of display 14 for combination, by a combiner 10, with an external forward view from an observing position 11. Reflector 15 and collimator 16 are positioned one to each side of display centre line 31. In this embodiment reflector 15 is facetted as an alternative to a plane mirror so that extra rotation of the mirror parts may be made for minimum obscuration of external view, without changing the reflection angle.

In accordance with the present invention the relay optics 17 includes spaced apart elements. For clarity these are represented as a first relay lens $L_1$ and a second relay lens, $L_2$, although the relay lenses may be themselves multi-element lens groups in accordance with known principles. The first relay lens $L_1$ is imaged in collimator 16 at or near the observer's position giving rise to a first exit pupil $P_1$. Biocular vision is achieved if both the observer's eyes are within the exit pupil. The second relay lens $L_2$ is also imaged by lens group $L_1$ and collimator 16 to give rise to a second pupil $P_2$ which due to magnification by $L_1$ may be positioned close to the combiner 10. The presence of the second exit pupil $P_2$ forwardly extends the field of binocular vision, so that full field biocular vision is maintained if the observation position 11 is brought towards the combiner, including such movement beyond first exit pupil $P_1$ in the volume of overlap of first exit pupil volume $V_1$ and second exit pupil volume $V_2$.

It will now be realised that the present invention may be configured for installation within aircraft space constraints, such as between windshield position 19 and a typical ejection line 20, to provide a wide field of biocular view with tolerance to forward observer movement and without recourse to the off-axis optics of prior art systems, thereby avoiding associated aberration and its expensive correction.

A further advantage of the present invention is favourable mass distribution since it will be realized that system components may be mounted in a framework of unitary construction, the centres of mass and inertia of which may be arranged, for example in an aircraft installation, to lie within instrument panel space, thereby facilitating secure mounting and reducing susceptibility to vibration.

Particular advantages are to be derived from a HUD in accordance with the present invention. Use of a narrow band diffractive optical element for collimator 16 provides rejection of extraneous light of wavelengths outside its bandwidth and of light from off-axis angles. In a system having a plane combiner 22 (FIG. 2) operated near axis ($\theta$) the angle of incidence $\alpha_1$ for transmission through the combiner 22 is not equal to the angle of incidence $\alpha_2$ for reflection. Combiner 22 may be fabricated for high transmission of light arriving at a first angle of incidence $\alpha_1$ and for high reflectance of light arriving at a second angle of incidence $\alpha_2$ in accordance with known diffractive optics principles.

A further advantage is that the possibility of display washout by flooding from sunlight is much reduced by reflector 15 (FIG. 1) blocking the optical axes of combiner 10 and collimator 16 and relay optics 17. Sunlight incidence directly on to $L_1$, and thereby into the relay optics is reduced by a filter 21 which may be a honeycomb filter comprising slats normal to the plane of relay lens $L_2$ and which will appear out of focus from the observer's position 11.

In military aviation an aircraft cockpit conventionally includes a display for head down viewing mounted beneath a head-up display. The form of any such display is limited by the cockpit room available and in current aircraft the available avionic information cannot be adequately displayed on conventional instruments.

The present invention provides a configuration in which military cockpit space constraints are accommodated, whilst providing a wide field of view head-up display system with adequate head-down information accommodation. Such an embodiment of the present invention will now be described.

Relay lens groups $L_1$ and $L_2$, collimator 16 and combiner 10 produce an image of display 14 at observing position 11 superimposed on an external view. (FIG. 3.) An intermediate image is produced in front of a reflector in the form of a plane mirror 30. The image is arranged to be symmetrical about a centre line 31. It will now be realised that a wide field of view HUD system as previously described may be installed within aircraft cockpit space constraints such as windshield line 32 and fairing 33. A third constraint which must be met in military cockpits is ejection line 34. Diffractive collimator 16 is a relatively lightweight component and is stowably mounted for retraction behind ejection line 34 in the event of ejection. The primary support (not shown in the Fig.) of collimator 16 is located close to its centre of inertia to minimise any vibration, which coincides with a hinge axis for stowage. Alternatively, the collimator may be frangible in the event of ejection.

An important requirement in the practical use of a head-up display system is the facility for continuously recording, via a cine or television camera, a representation of the outside view together with the full display. In the present embodiment a camera 35 together with periscope arrangement 36 fulfils the requirement. Precise installation of the camera and periscope is not required and this straightforward arrangement is a major advantage over prior art wide field of view systems, wherein the limited exit pupil makes it impossible to record the full field of view without recourse to providing a separate secondary optical system dedicated to recording, with attendant doubts about alignment with the primary display.

Modern military aircraft usually contain another display mounted below the head-up display system installation and viewed head-down. In the present invention an image of a display 37 on CRT 38 is provided for head-down viewing. Light from the display is directed for viewing by reflectors 39 and 40. An intermediate image 43 is formed by relay lens groups 41 and the image is partially or fully collimated by a lens 42, in accordance with known practice. The path of light from CRT 38 passes between relay optics elements $L_1$, $L_2$. An absorption filter 46 placed in front of the lens 42 reduces the effect of extraneous incident light.

It will be realised that both the head-up display and the head-down display system described thus far may be straightforwardly accommodated within space restrictions 32, 33 and 34. Optical elements $L_1$, $L_2$, 41, 39, 40, 42 of the display systems are in proximity and may advantageously be installed in a single installation as a display optical package. It will further be realised that utilization of space is efficient compared with prior art systems. A further display 44 on CRT 45 may be provided for direct viewing from observing position 11. CRTs 38 and 12 and associated electronics may advantageously be configured as a dismountable package for ease of servicing.

In an alternative embodiment of the present invention a plurality of displays may be imaged on to a common centre line by providing a plurality of separate CRTs, relay optics and folding mirrors, the folding mirrors each being inclined for incidence on a single collimating mirror. Displays in separate channels may advantageously be projected at different wavelengths to produce a colour presentation.

I claim:

1. A head-up display system comprising:
   means providing a display object and a HUD optical relay means for forming a real image of the display object and together defining an optical axis, the HUD optical relay means including two lens systems each having at least one optical surface axially separated from one another; and
   associated collimated monitor means including means providing a monitor object, monitor optical relay means for forming a real image of the monitor object, a monitor collimator for producing a collimated image of the monitor object at the observer's viewing position and first and second reflectors for directing light from the monitor optical relay to the monitor collimator; the monitor object and the first reflector being located on the opposite side of the said optical axis with respect to the second reflector and the monitor collimator and the first reflector being so located as to direct light from the monitor optical relay across the optical axis between the two lens systems; and axial separation of the two lens systems being sufficient not to obstruct the monitor means.

2. A head-up display system according to claim 1 in which the real image of the monitor object is formed between the first and second reflectors.

3. A head-up display system according to claim 1 in which the monitor object, the monitor optical relay and first reflector are located generally above the said optical axis and the second reflector and monitor collimator are located generally beneath the said optical axis, all of said components being located beneath the observer's external viewing space whereby the collimated monitor image is observed beneath the head-up display.

4. A head-up display system according to claim 1 further including a display reflector located above the observer's viewing space, an inclined combiner located within the viewing space and a display collimator located beneath the viewing space, whereby the real image of the display object is formed in front of the display reflector and light from the display object is reflected by the display reflector, through the combiner to the display collimator and back to the combiner, wherefrom it is reflected to an exit pupil close to the viewing position.

5. A head-up display system according to claim 4 in which the said display reflector is opaque to transmission and blocks the said optical axis.

6. A head-up display system according to claim 4 in which the said display collimator is opaque to transmission.

7. A head-up display system according to claim 4 in which the display collimator is a diffractive optical element having a narrow band response and is mounted to operate at angles of incidence close to the normal.

8. A head-up display system according to claim 4 in which the combiner is a diffractive optical element arranged for high transmission of light received from the display reflector at a certain angle of incidence and for high reflection of light received from the display collimator at a slightly different angle of incidence.

* * * * *